US010419124B2

(12) United States Patent
Renaudier et al.

(10) Patent No.: US 10,419,124 B2
(45) Date of Patent: Sep. 17, 2019

(54) METHOD AND DEVICE FOR OPTICAL DATA TRANSMISSION

(71) Applicant: Alcatel Lucent, Boulogne Billancourt (FR)

(72) Inventors: Jeremie Renaudier, Nozay (FR); Rafael Rios Muller, Nozay (FR); Gabriel Charlet, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 143 days.

(21) Appl. No.: 14/652,513

(22) PCT Filed: Dec. 9, 2013

(86) PCT No.: PCT/EP2013/075900
§ 371 (c)(1),
(2) Date: Jun. 16, 2015

(87) PCT Pub. No.: WO2014/095445
PCT Pub. Date: Jun. 26, 2014

(65) Prior Publication Data
US 2015/0349894 A1    Dec. 3, 2015

(30) Foreign Application Priority Data

Dec. 19, 2012   (EP) .................................... 12306617

(51) Int. Cl.
*H04B 10/508*   (2013.01)
*H04B 10/516*   (2013.01)
(Continued)

(52) U.S. Cl.
CPC ......... *H04B 10/508* (2013.01); *H04B 10/516* (2013.01); *H04B 10/5161* (2013.01);
(Continued)

(58) Field of Classification Search
None
See application file for complete search history.

(56) References Cited

U.S. PATENT DOCUMENTS

2008/0232816 A1* 9/2008 Hoshida .................. H04J 14/06
398/152
2009/0324247 A1* 12/2009 Kikuchi .................. G02F 1/225
398/159

(Continued)

FOREIGN PATENT DOCUMENTS

CN          102244556       11/2011
DE         202006007966      7/2006
(Continued)

*Primary Examiner* — Kenneth N Vanderpuye
*Assistant Examiner* — David W Lambert
(74) *Attorney, Agent, or Firm* — McCracken & Gillen LLC

(57) ABSTRACT

A method and device for optical data transmission are disclosed. Data bits are transmitted in the form of data symbols, by modulating an optical signal in dependence on the data bits and in accordance with two or more constellation schemes. The data bits are transmitted, by generating first data symbols, which represent respective sets of data bits containing an even number of data bits. The first data symbols are generated, by modulating the optical signal in accordance with a first constellation scheme. Furthermore, the data bits are transmitted, by generating second data symbols, which represent respective sets of data bits having an odd number of data bits. The second data symbols are generated, by modulating the optical signal in accordance with a second constellation scheme. The first and the second data symbols are generated at a predefined symbol rate, such that the first and the second data symbols are interleaved in time.

11 Claims, 8 Drawing Sheets

(51) Int. Cl.
*H04B 10/564* (2013.01)
*H04L 27/00* (2006.01)
*H04L 27/34* (2006.01)

(52) U.S. Cl.
CPC ....... *H04B 10/564* (2013.01); *H04L 27/0008* (2013.01); *H04L 27/34* (2013.01)

(56) References Cited

U.S. PATENT DOCUMENTS

2010/0111534 A1* 5/2010 Veselka, Jr. ......... H04J 14/0221
398/79
2013/0136452 A1* 5/2013 Zhou .................... H04B 10/116
398/98
2015/0139652 A1* 5/2015 Bottari ................ H04J 14/0256
398/79

FOREIGN PATENT DOCUMENTS

| EP | 2426836 | 8/2010 |
|----|---------|--------|
| JP | H01155749 | 6/1989 |
| JP | 2005086593 | 3/2005 |
| JP | 2008085942 | 4/2008 |
| JP | 2011527026 | 10/2011 |
| JP | 2012119759 | 6/2012 |
| WO | 2010061784 | 6/2010 |

* cited by examiner

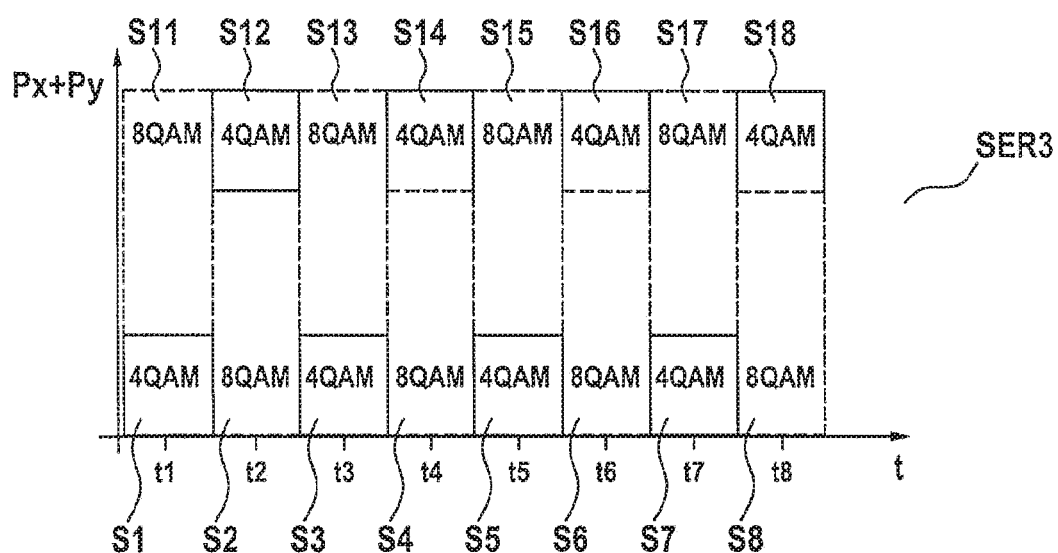

METHOD AND DEVICE FOR OPTICAL DATA TRANSMISSION

FIELD OF THE INVENTION

The invention relates to a method of optical data transmission and an optical data transmission device.

BACKGROUND

For transmitting data, it is these days a prominent solution, to rely on optical data transmission. For transmitting data bits, one or more symbols may be transmitted by means of an optical transmission signal, wherein a data symbol represents a set of data bits.

A symbol, alternatively called data symbol, is transmitted, by modulating the phase and/or the amplitude of an optical carrier signal in dependence on the set of data bits which shall be represented by this symbol. The modulation of the optical carrier signal is carried out in accordance with a constellation scheme of a respective modulation format.

One prominent candidate of a modulation format relying on phase modulation is that of binary phase-shift keying (BPSK). In BPSK, the phase of the optical carrier signal is modulated, such that it takes on one out of two discrete phase values. Thus, in BPSK, a symbol represents one data bit.

Another prominent candidate of a modulation format carrying out phase modulation is that of quaternary phase-shift keying (QPSK), which may be called alternatively four quadrature amplitude modulation (4QAM). In QPSK, the phase of the optical carrier signal is modulated, such that it takes on one out of four discrete phase values. Thus, in QPSK, a symbol represents two data bits that are to be transmitted.

Another prominent candidate of a modulation format is 8QAM, in which the phase and the amplitude of the optical carrier signal are modulated in dependence on the set of data bits, that shall be represented by data symbols. The phase and the amplitude of the optical carrier signals are modulated, such that they take on one out of eight discrete values of the corresponding constellation scheme. Thus, in 8QAM a symbol represents three data bits.

SUMMARY

Proposed is a method of optical data transmission. In this proposed method, data bits are transmitted in the form of data symbols, by modulating an optical signal in dependence on the data bits and in accordance with two or more constellation schemes.

The data bits are transmitted, by generating first data symbols, which represent respective sets of data bits containing an even number of data bits. The first data symbols are generated, by modulating the optical signal in accordance with a first constellation scheme.

Furthermore, the data bits are transmitted, by generating second data symbols, which represent respective sets of data bits having an odd number of data bits. The second data symbols are generated, by modulating the optical signal in accordance with a second constellation scheme.

Preferably, the optical signal is an optical carrier signal.

The first and the second data symbols are generated at a predefined symbol rate, wherein the first and the second data symbols are interleaved in time.

In order to grasp the advantages of the proposed method the following aspects have to be taken into consideration.

When transmitting data bits using a specific modulation format, in which a data symbol represents a specific number of data bits, and performing the transmission at a specific symbol rate, the data transmission is carried out at a resulting respective data rate. If it is desired to increase the data rate of the transmission but at the same time to keep the same symbol rate, the data transmission at the increased data rate has to be carried out, such that a modulation format with a respective constellation scheme having an increased number of constellation points is used. Due to the increased number of constellation points, a data symbol also represents an increased number of data bits.

Comparing the transmission capabilities of one specific modulation format with a corresponding specific number of constellation points and another specific modulation format with another, increased number of constellation points, the distance of the constellation points to each other for the other modulation format is decreased with respect to the distance of the constellation points for the one specific modulation format. Thus, the other modulation format is more sensitive to noise artefacts or other artefacts affecting the optical transmission signal.

Thus, when attempting to achieve a same bit error ratio at a receiving side, the use of the other modulation format with an increased number of constellation points will only work properly over a reduced optical transmission reach compared to the one specific modulation format, since transmission artefacts increase as the optical transmission distance increases. This effect is also called reach reduction.

For example, when attempting to transmit data in the form of symbols via an optical carrier signal as described above, the necessary transmission distance that shall be covered for a specific bit error ratio may be shorter than the maximum possible distance that is coverable with a specific first modulation format, for example 4QAM. At the same time, this transmission distance may be longer than a maximum transmission distance coverable by a second modulation format, for example 8QAM. The consequence thus would be, that the first modulation format, e.g. 4QAM, is used, although the transmission distance to be covered is shorter than the maximum transmission distance coverable by this first modulation format. Transmitting data using the second modulation format, e.g. 8QAM, is not feasible, since the increased sensitivity of the constellation points in the corresponding constellation scheme to transmission artefacts would lead to a bit error ratio, that exceeds an allowable maximum bit error ratio.

In other words, when relying on a data transmission in which only one modulation format with a respective constellation scheme is used for transmitting all data symbols, there is only the possibility to switch between the first and the second modulation format with a specific granularity. In the given example, in which the first modulation format is 4QAM and the second modulation format is 8QAM, this granularity is given by an increase from 2 bits in 4QAM to 3 bits in 8QAM, which is equal to a data increase of 50% or a factor of 1.5.

The method proposed herein deviates from the principal of using a same modulation format for all data symbols in the optical data transmission. Instead, first data symbols are generated in accordance with a first constellation scheme of a first modulation format and second data symbols are generated in accordance with a second constellation scheme of a second modulation format, wherein the first modulation format is different from the second modulation format, and wherein the resulting first and second data symbols are interleaved. A first data symbol represents an even number of data bits and a second data symbol represents an odd number of data bits.

The achieved advantage is, that such a mix of modulation formats used for the data transmission allows for a different granularity of data transmission increase. In detail, relating to the example given above, the first modulation format with the first constellation scheme may be that of 4QAM, in which the first data symbol presents two data bits. The second modulation format with the second constellation scheme of 8QAM results in second data symbols representing three data bits. Thus, in comparison to a data transmission using only the modulation format of 4QAM in which a data symbol represents two data bits, the data rate is increased by a factor of 1.25.

The proposed method not only bears the advantage of increasing a data rate with a finer granularity, but also, that the data transmission proposed is not as sensitive to transmission artefacts in average, as when transmitting data using a next-higher modulation format with a next-higher number of constellation points in the constellation scheme. In the given example, the data transmission proposed herein with alternating data symbols of the two different modulation formats 4QAM and 8QAM is not as sensitive to transmission artefacts, such as for example cross-phase modulation or other artefacts, as a data transmission using the modulation format 8QAM exclusively. Thus, the coverable transmission distance that may be achieved by the proposed method is larger than the transmission distance coverable by employing the next-higher modulation format, but also is smaller than the transmission distance coverable by the initial modulation format, in this example 4QAM, but with an increased data rate.

Thus, the proposed transmission method allows to increase the data rate for transmission over a specific transmission distance, which could not be covered by a data transmission employing the higher modulation format. At the same time the proposed method achieves a higher data rate, than a transmission employing the initial modulation format, for example 4QAM. Thus, the proposed transmission method allows optical data transmission at a finer granularity of a data rate and a finer granularity of coverable transmission distances.

DESCRIPTION OF EMBODIMENTS

Figure 1:
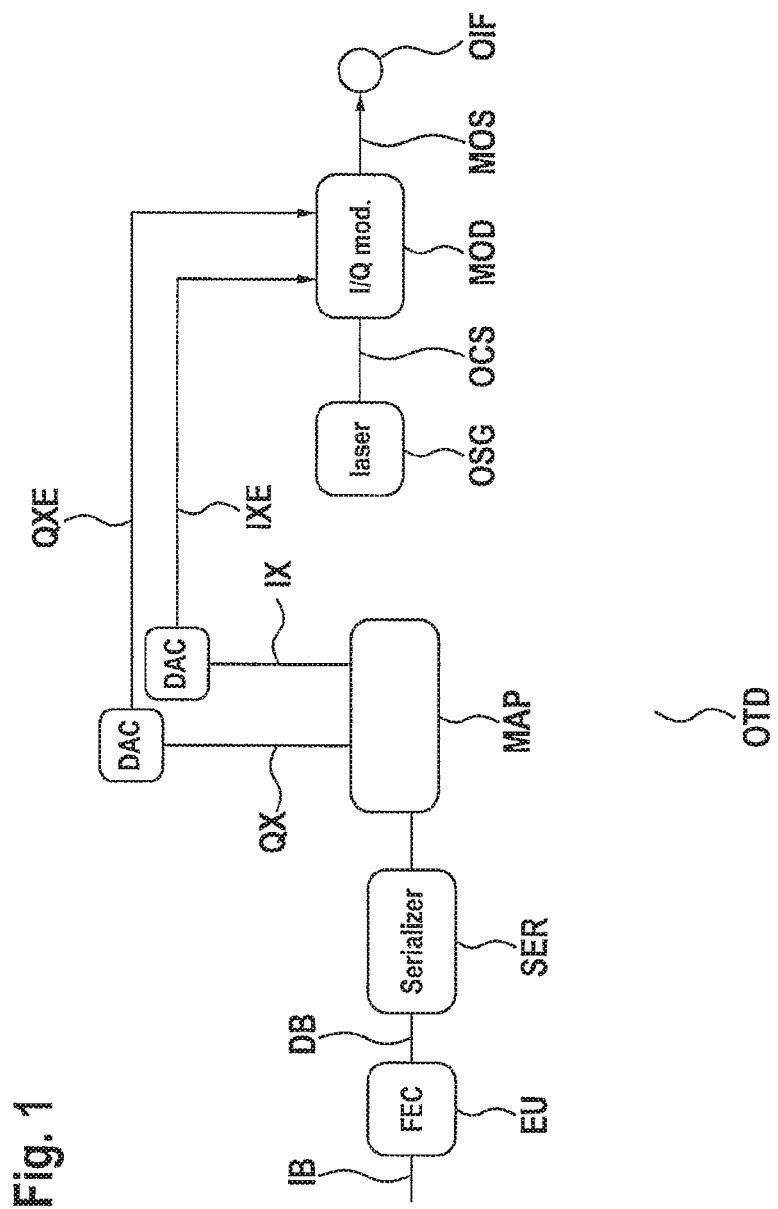
FIG. 1 shows a proposed optical data transmission device according to an embodiment.

FIG. 1 shows a proposed optical transmission device OTD. The device OTD contains an encoding unit EU, which receives information bits IB and encodes the information bits IB into a string of data bits DB. The data bits DB are partitioned by a serializer SER into sets of data bits and then provided to a bit-to-symbol mapping unit MAP. At one time instance, the serializer SER provides a set of data bits containing an even number of data bits. At a next successive time instance, the serializer SER provides a set of data bits containing an odd number of data bits. Preferably, the first set contains N data bits, wherein N is an even number, and the next successive set contains N+1 data bits.

From one time instance to a next time instance, the respective sets of data bits provided by the serializer SER alternates between the even and the odd number of data bits. The mapping unit MAP maps a provided set of data bits onto respective symbols of respective modulation formats. At a first time instance, the mapping unit MAP generates a first data symbol, which represents a first set containing an even number of data bits. At a next time instance, the mapping unit MAP generates a second data symbol representing a second set having an odd number of data bits. The mapping unit MAP generates the data symbols, by generating respective quadrature phase signal components QX and inphase signal components IX. The signal components QX and IX, which are preferably digital values, are then converted by digital-analogue converters DAC to respective electrical components QXE and IXE. A modulation unit MOD modulates an optical carrier signal OCS, which is provided by an optical signal generation unit OSG, using the signal components QXE and IXE. Thus, the device OTD generates a first data symbol, by modulating the optical signal OCS in accordance with a first constellation scheme, while the device OTD generates the second data symbol, by modulating the optical signal OCS in accordance with a second constellation scheme. The resulting modulated optical signal OS is then provided to an optical interface OIF.

Figure 2:
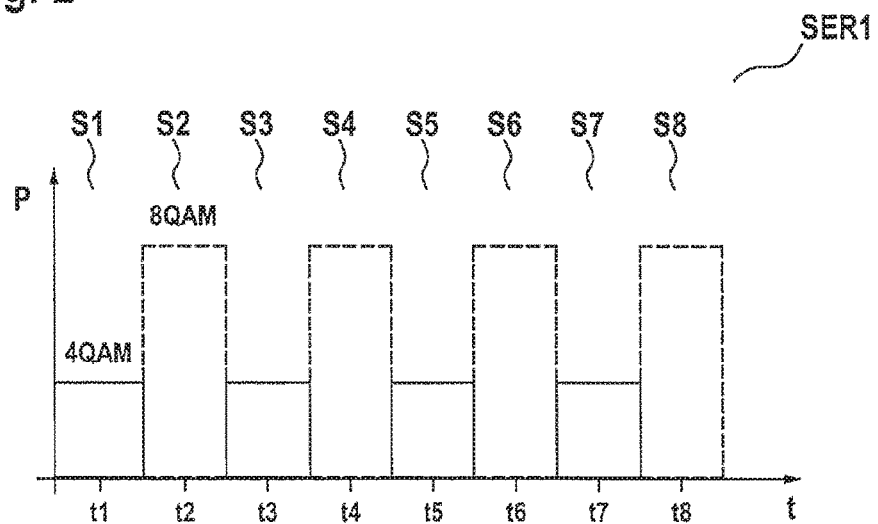
FIG. 2 shows first and second data symbols.

The generation of the first and the second data symbols is now described in detail with regard to FIG. 2.

FIG. 2 shows a series SERI of data symbols S1, . . . , S8, as generated by the device described with regard to FIG. 1. The data symbols S1, . . . , S8 are generated at respective time instances t1, . . . , t8. FIG. 2 shows the power P of these symbols S1, . . . , S8 over the time t.

Since the serializer SER of FIG. 1 provides at the first time instance t1 an even number of data bits to the mapping device MAP, which are in this example two data bits, the mapping device MAP generates the first data symbol S1, which represents a set of data bits containing the even number of data bits. Furthermore, since the serializer SER provides a set of data bits having an odd number of data bits, in this example three data bits, to the mapping device MAP, the device MAP generates the second data symbol S2, which represents the odd number of data bits.

The serializer SER alternates between the even number of data bits and the odd number of data bits over the consecutive time instances t1, . . . , t8. In parallel, the mapping device MAP also alternates the used modulation formats between successive time instances t1, . . . t8. This leads to first data symbols S1, S3, S5, S7 and second data symbols S2, S4, S6, S8, which are interleaved in time.

In the example shown in FIG. 2, the first modulation format with a corresponding first constellation scheme used for generating the first data symbols S1, S3, S5, S7 is that of 4QAM, such that one of the first data symbols S1, S3, S5, S7 represents two data bits. Furthermore, the second modulation format with the corresponding second constellation scheme used for generating the second data symbols S2, S4, S6, S8 is that of 8QAM, such that one of the second symbols S2, S4, S6, S8 represents three data bits.

In comparison to a transmission employing only the modulation format of 4QAM, the average data rate of the transmission method illustrated in FIG. 2 is increased by a factor of 1.25. The examples of 4QAM and 8QAM are only given as a non-limiting example.

Comparing the proposed transmission method illustrated in FIG. 2 with a transmission employing only the modulation format of 4QAM, the data rate is increased by a factor of 1.25, while at the same time the coverable transmission reach that can be achieved by the proposed method is reduced in comparison to a transmission employing only the modulation format of 4QAM. But still, the proposed optical transmission method is able to cover a transmission distance at a same given bit error ratio at the same transmission conditions, that is greater than a transmission method employing only the modulation format of 8QAM. This is due to the fact, that the average sensitivity of the transmitted symbols S1, . . . , S8 is in the proposed transmission method smaller than the sensitivity of data symbols when employing only the modulation format of 8QAM. Thus, the proposed method allows to increase a transmission data rate achieving a longer optical transmission distance at a same bit error ratio than when switching totally to a next higher modulation format, such as in this example 8QAM.

The first data symbols S1, S3, S5, S7 are preferably transmitted at a first power level, while the second data symbols S2, S4, S6, S8 are transmitted at a second power level. Furthermore, the power ratio of the first and second power level is preferably chosen to a pre-defined value. This value is preferably chosen such, that the sequence of the first data symbols S1, S3, S5, S7 experiences a same bit-error ratio as the sequence of the second data symbols S2, S4, S6, S8, in the case that these data symbol sequences are transmitted over a same optical transmission channel or optical transmission link of a pre-defined length.

In the case of using QPSK, or 4 QAM, for generating the first data symbols S1, S3, S5, S7 and using 8QAM for generating the second data symbols S2, S4, S6, S8, the second power level is chosen approximately 4 dB higher than the first power level. The advantage of this is now described in detail with regard to FIG. 3.

Figure 3:
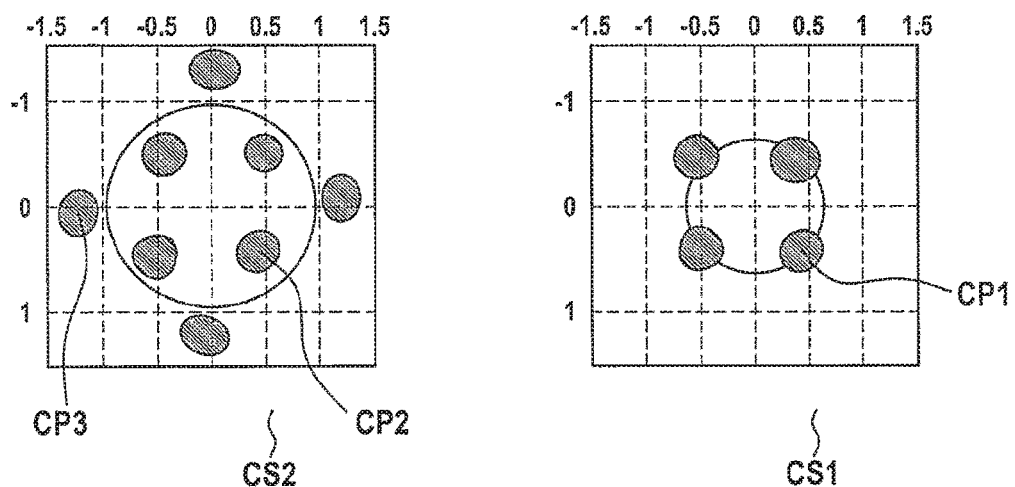
FIG. 3 shows constellation schemes of different modulation formats.

FIG. 3 shows on the right-hand side a constellation scheme CS1 of a first modulation method, in this example of 4QAM. Furthermore, FIG. 3 shows on the left-hand side a constellation scheme CS2 of a second modulation method, in this example 8QAM. The power ratio between the power levels used as maximum power levels for the constellation schemes CS1 and CS2 are chosen, such that they form a pre-defined power ratio. Preferably, in the example of 4QAM and 8QAM, the power ratio is chosen, such that the second power level of the second modulation format for the constellation scheme CS2 is approximately 4 dB higher than the first power level of the first modulation format with the first constellation scheme CS1.

In such a choice of the power levels achieving a specific pre-defined power ratio, the constellation points CP1 of the constellation scheme CS1 for the first modulation method coincide with the inner constellation points CP2 of the second constellation scheme CS2 for the second modulation method. The fact, that the constellation points CP1 of the first constellation scheme CS1 and the constellation points CP2 on the inner ring of the second constellation scheme CS2 coincide, has the advantage, that at a receiving side a multi-modulus algorithm can be used, which uses only 2 rings for polarization demultiplexing.

Figure 4:
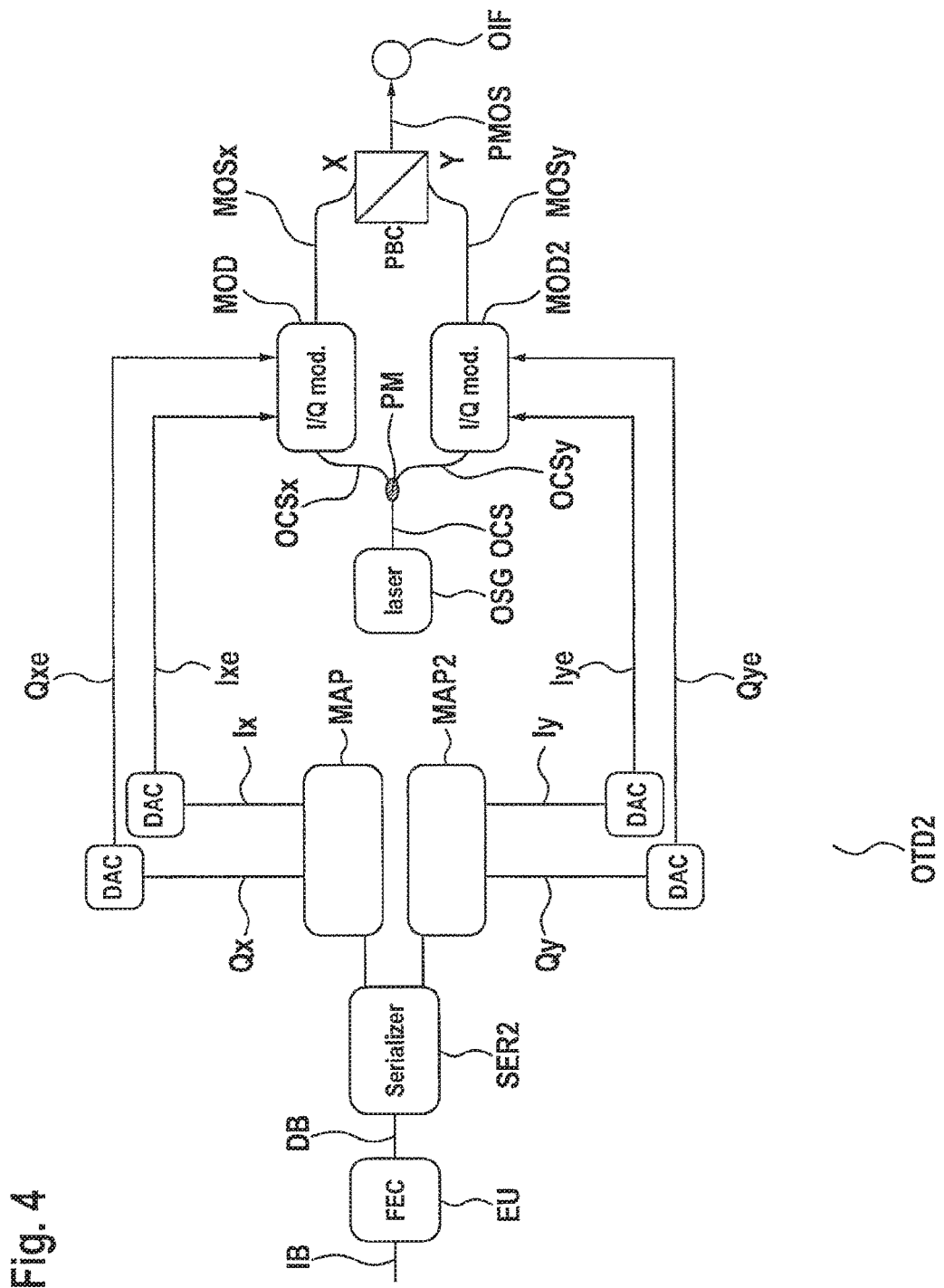
FIG. 4 shows the proposed optical data transmission device according to a further embodiment.

FIG. 4 shows the proposed optical data transmission device OTD2 according to a further embodiment. The device OTD2 receives information bits IB at an encoding unit EU, which encodes the information bits IB into data bits DB. A serializer SER2 provides first sets of an even number of data bits and second sets of an odd number of data bits to the mapping unit MAP, as previously described above. The modulation unit MOD receives an optical carrier signal OCSx, which lies essentially within a first polarisation plane. The signal OCSx is generated, by splitting the signal OCS into the first polarised signal OCSx lying in a first polarisation plane and a second polarised signal OCSy, which lies in a second polarization plane that is orthogonal to the first polarisation plane. This splitting is performed by a polarisation multiplexing device PM. The modulator MOD modulates the signal OCSx and provides the resulting modulated signal MOSx to a polarisation beam combiner PBC.

The serializer SER2 provides a third set of data bits containing the odd number of data bits to a mapping unit MAP2. Furthermore, the serializer SER2 provides a fourth set of data bits containing the even number of data bits to the mapper MAP2. The mapper MAP2 maps a third set of data bits onto a third data symbol and the fourth set of data bits onto a fourth data symbol. The resulting quadrature signal values Qy and in-phase signal values Iy are provided to digital-analogue converters DAC generating respective electrical quadrature signal components Qye and respective electrical in-phase signal components Iye. The components Qye and Iye are then used by a modulation unit MOD2, which modulates the polarised signal OCSy, for generating the modulated signal MOSy. The signal MOSy is then provided to the polarisation beam combiner PBC, which combines the signals MOSx and MOSy to a combined optical signal PMOS. The signal is PMOS is then provided to the optical interface OIF.

Figure 5A:
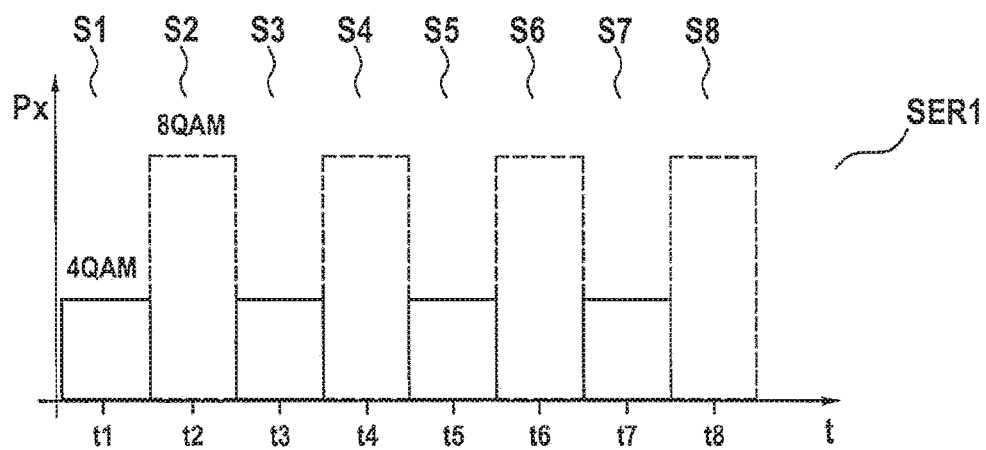
FIG. 5 shows an interleaving of data symbols in time and as well as in different polarisation planes of differently polarised optical signals.
Figure 5B:
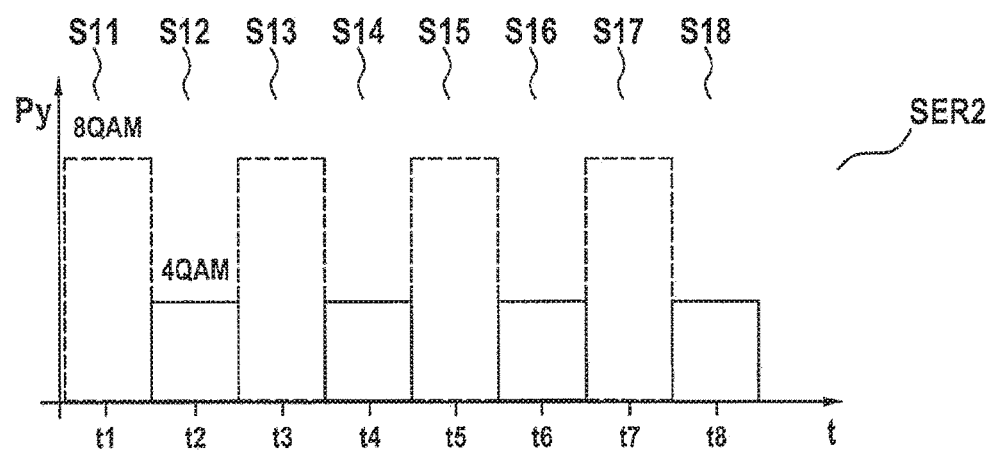

The provisioning of the third set of data bits and the fourth set of data bits by the serializer SER2 to the mapper MAP2 as well as the generation of the third data symbol and the fourth data symbol by the mapper MAP2 is now described in detail with regard to the FIGS. 5a and 5b.

FIG. 5a shows series of symbols SERI, as previously described with regard to FIG. 2. In FIG. 5b, data symbols S11, . . . , S18 generated by the serializer SER2 and the mapper MAP2 of FIG. 4 in conjunction are depicted over respective time instances t1, . . . , t8. The time instances t1, . . . , t8 of FIG. 5b coincide with the time instances t1, . . . , t8 of FIG. 5a. Thus, FIG. 5b shows a series CR2 of symbols S11, . . . , S18.

As previously mentioned, the serializer SER2 of FIG. 4 provides a certain set of data bits containing an odd number of data bits at a first time instance t1. This is indicated in FIG. 5b by the indication of the example of 8QAM as a modulation format in which a data symbol represents an odd number of data bits. Furthermore, the mapper MAP2 generates the symbol S11 at this time instance t1.

At the next following time instance t2, the serializer SER2 of FIG. 4 provides the previously mentioned fourth set of data bits having an even number of data bits to the mapper MAP2 of FIG. 4. This is indicated in FIG. 5b by the denotation of the modulation format 4QAM being used in the time instance t2. The mapper MAP2 of FIG. 4 generates in this time instance t2 the data symbol S12 shown in FIG. 5b, which is a data symbol representing an even number of data bits. The provisioning of data bit sets containing data bits and other data bit sets containing an even number of data bits generates over the time instances t, . . . , t8. Furthermore, the generation of respective data symbols S11, . . . , S18 is carried out, such that the modulation of the optical signal of OCSy alternated for using the first and the second constellation schemes. Thus, the previously mentioned third and fourth data symbols are generated at the pre-defined symbol rate wherein the third data symbols S11, S13, S15, S17 and the fourth data symbols S12, S14, S16, S18 are interleaved in time.

FIG. 5c shows a coordination of the transmission of the first data symbols S1, . . . , S8 at same time instances t1, . . . , t8 as the transmission of the data symbols S11, . . . , S18. The first data symbols S1, S3, S5, S7 are transmitted at respective same time instances t1, t3, t5, t7 as the third data symbols S11, S13, S15, S17. Furthermore, the second data symbols S2, S4, S6, S8 are transmitted at the same respective time instances as the fourth data symbols S12, S14, S16, S18 at time instances t2, t4, t6, t8.

Preferably, the power level of the third data symbols is chosen as the previously mentioned second power level and the power level of the fourth data symbols is chosen as the previously mentioned first power level, wherein the power ratio of the first and second power level is chosen to a pre-defined value. The advantage of this has been described in detail previously with regard to the symbols S1, . . . , S8 shown in FIG. 2.

Furthermore, the advantage of the synchronisation of the different data symbols, as shown in FIG. 5c as the series SER3, has the advantage, that the overall power level Px+Py of the different symbols leads to a constant power level. This avoids power fluctuation issues for monitoring optical systems. Furthermore, avoiding power differences between transmitted polarisations avoids to induce issues for monitoring purposes in general. In other words, the constant optical power profile of the sum of the two transmitted signals MOSx and MOSy avoids power fluctuation.

Figure 6:
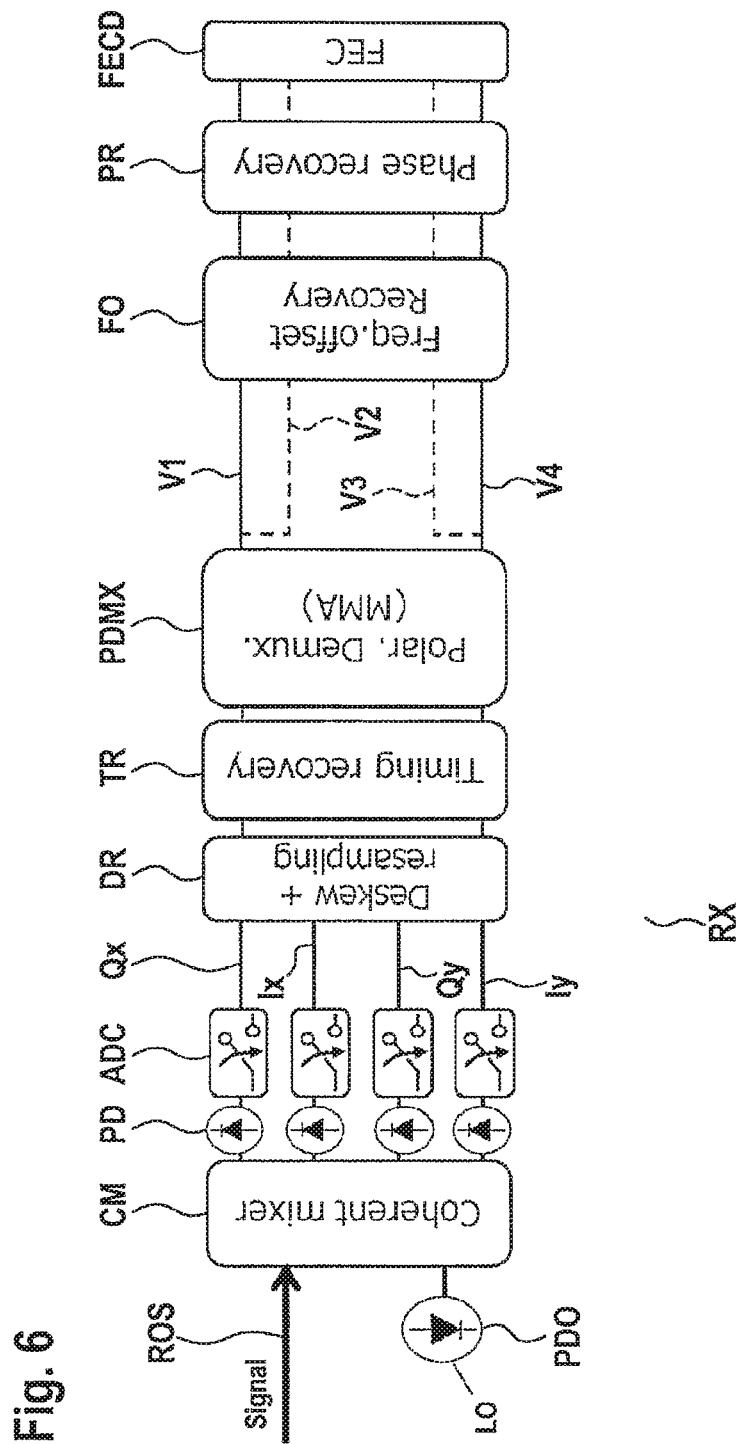
FIG. 6 shows an architecture of a proposed receiver.

FIG. 6 shows an embodiment of a receiving device RX that may be used at a receiving site. The receiving device RX receives a received optical signal ROS, which is mixed in a coherent mixer CM with a signal generated by a local oscillator signal LO. The signal LO is converted from the electrical to the optical domain buyer photo diode PDO. The resulting signal components provided by the coherent mixer CM are then converted from the optical to the electrical domain by use of respective photo diodes PD. In the electrical domain, these signal components are then sampled for analogue to digital conversion by analogue-digital converters ADC. This leads to a quadrature signal component QX and an in-phase signal component IX for one polarisation plane as well as a quadrature signal component QY and an in-phase signal component IY for the other, orthogonal polarisation plane. Deskewing and resampling is carried out in a further step DR. Timing recovery is preferably carried out in step TR.

Polarisation de-multiplexing is carried out using the multi-modulus algorithm as described in the document "W. A. Sethares, G. A. Rey, and Jr. C. R. Johnson, "Approach to Blind Equalization of Signal with Multiple Modulus," IEEE Proc., ICASSP, April 1989, pp. 972-975", which is carried out in a step PDMX.

The step of polarisation de-multiplexing PDMX provides sequences of symbol values 1, V2, V3, V4. The symbol sequence V1 is composed of estimated values for the first data symbols. The symbol sequence V2 is composed of estimated values for the second data symbols. The symbol sequence V3 is composed of estimated values for the third data symbols. The symbol sequence V4 is composed of estimated values for the fourth data symbols.

The generated symbol values of the sequences V1, . . . , V4 may be subject to a frequency offset recovery carried out in a step FO as well as well as a phase recovery carried out in a step PR.

The resulting data symbols and data bits may then be subject to forward error decoding carried out in the step FECD.

Figure 7:
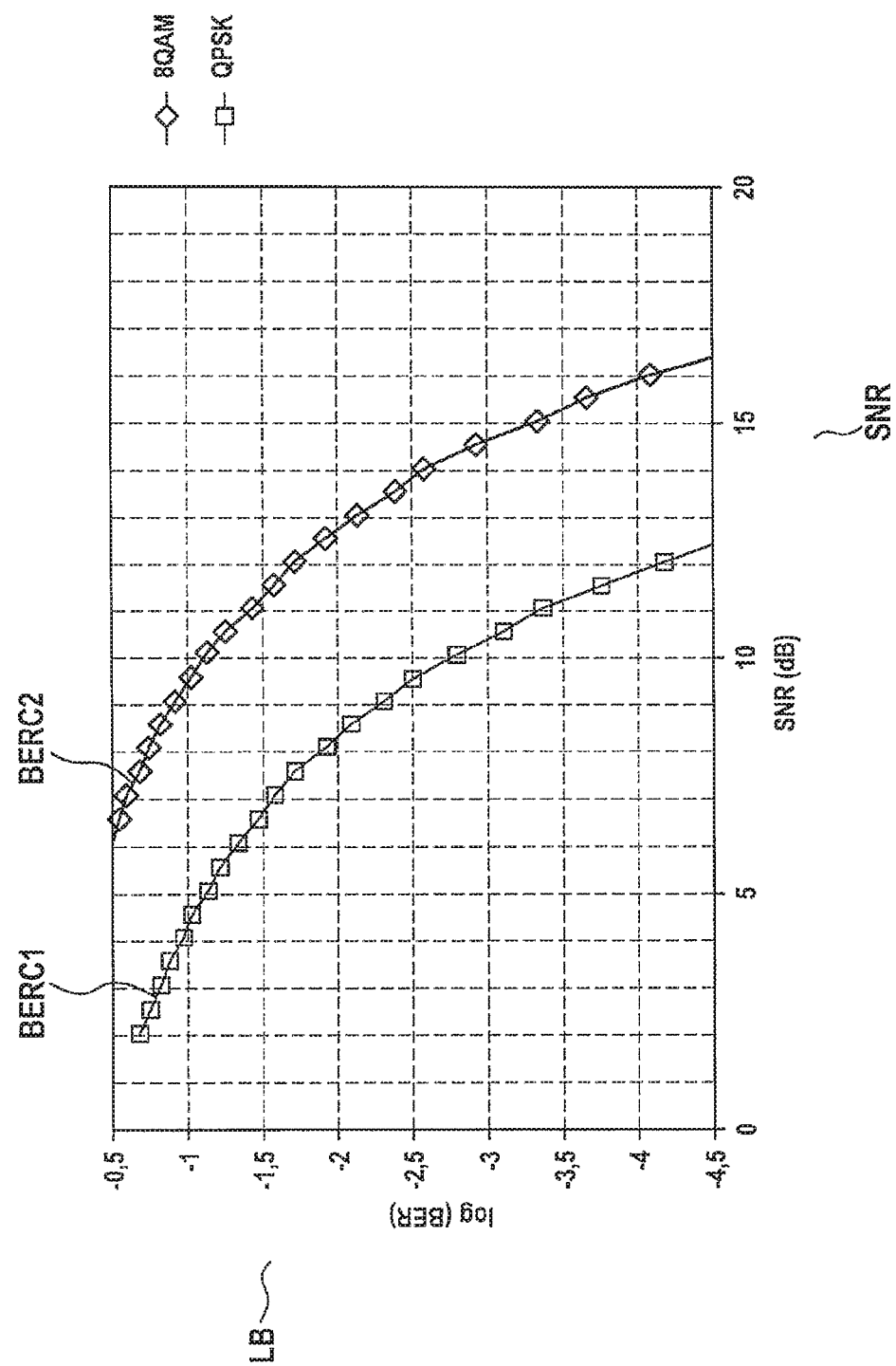
FIG. 7 shows achievable bit error ratios for different constellation schemes.

FIG. 7 shows a logarithmic bit error ratio LB achieved for different modulation formats over an optical signal-to-noise ratio SNR.

A first bit error ratio curve BERC1 indicates achieved logarithmic bit error ratios LB for a transmission using a modulation format of QPSK. Another, second bit error ratio curve BERC2 indicates achieved logarithmic bit error ratios LB for data transmission employing a data modulation format of 8QAM.

When attempting to keep a bit error ratio below a pre-defined threshold, for example the value of −3 for a logarithmic bit error ratio, the method of QPSK is able to handle a signal-to-noise ratio SNR, which is approximately 4 dB lower than a signal-to-noise ratio, that may be handled by the method of 8QAM.

Figure 8:
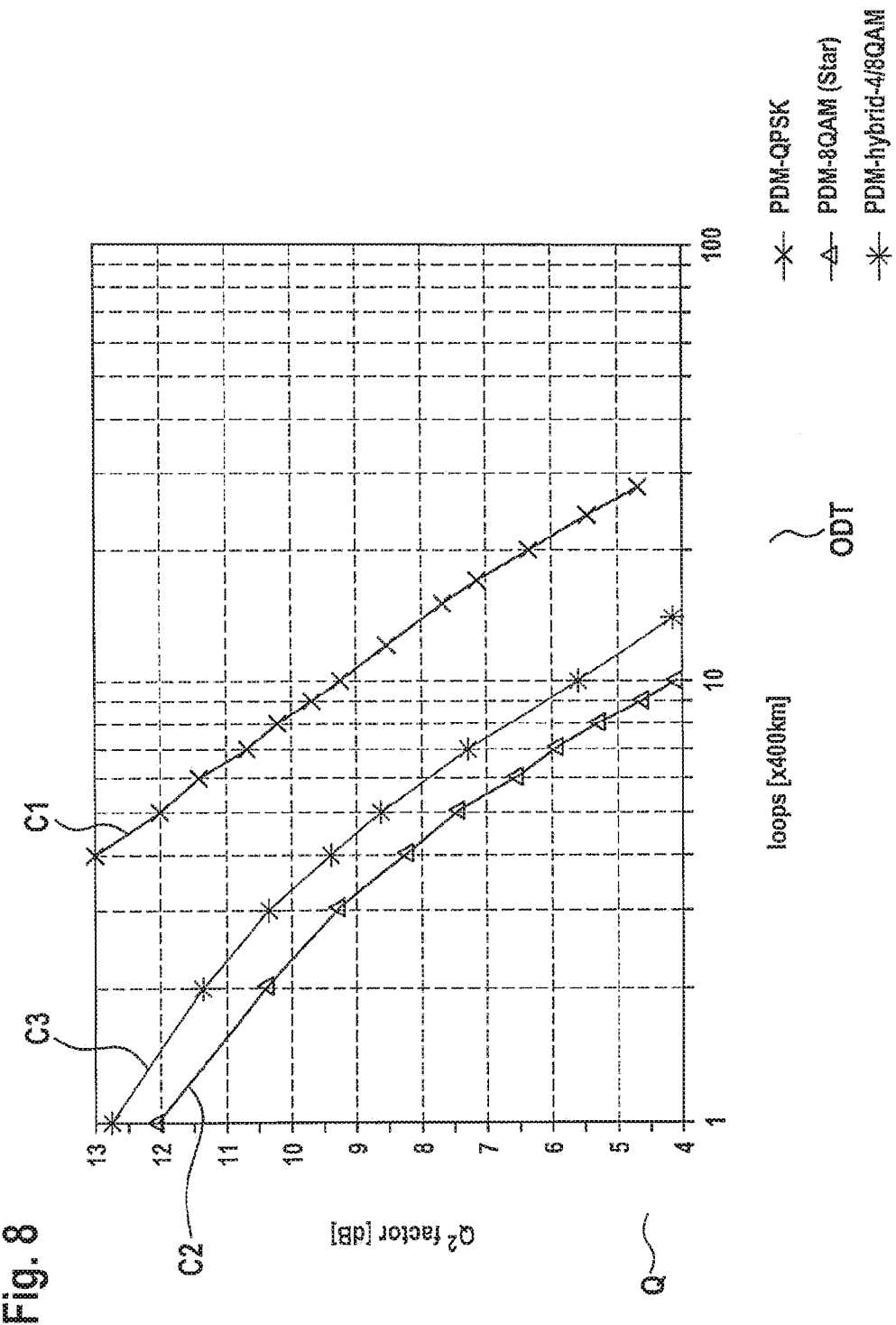
FIG. 8 shows resulting $Q^2$-factors for different transmission methods.

FIG. 8 shows a $Q^2$-factor Q in dB over optical transmission distances ODT for different modulation formats. The first curve C1 shows $Q^2$-factors achieved, when performing polarisation multiplexing with QPSK on each of the polarised signals. The curve C2 shows $Q^2$-factors achieved when performing polarisation multiplexing with a modulation method of 8QAM being performed on each of the polarised optical signals.

The curve C3 shows $Q^2$-factors achieved when employing the proposed method, within which polarisation multiplexing is performed, such that each of the polarised optical signals is modulated with alternating modulation schemes for successive time instances, in this example 4QAM and 8QAM. Clearly, the proposed method achieves according to the curve C3 same $Q^2$-factors for transmission distances ODT that are longer than transmission distances at the same $Q^2$-factor for the method of polarisation multiplexing employing only 8QAM. Also, the proposed method according to the curve C3 achieves same $Q^2$-factors for transmission distances ODT that are shorter than when using the method of polarisation multiplexing with 4QAM or QPSK for modulation on each of the optical signals being polarised. It has to be kept in mind, that the proposed method achieves a higher data rate than that, which only employs QPSK on each of the polarised signals.

The invention claimed is:

1. A method of optical data transmission, comprising the steps of:

transmitting data bits in the form of data symbols, by modulating an optical signal in dependence on said data bits and in accordance with two or more constellation schemes, said transmitting step further comprising the steps of:

generating first data symbols representing respective sets of data bits containing an even number of data bits, by modulating said optical signal in accordance with a first constellation scheme and transmitting said first data symbols at a first power level, generating second data symbols representing respective sets of data bits containing an odd number of data bits, by modulating said optical signal in accordance with a second constellation scheme and transmitting said second data symbols at a second power level, generating said first and said second data symbols at a predefined symbol rate, such that said first and said second data symbols are interleaved in time, wherein a power ratio of said first and said second power level is chosen to a predefined value such that a portion of the first constellation scheme coincides with a portion of the second constellation scheme, and the predefined value is chosen such that a sequence of first data symbols experiences a same bit error ratio as a sequence of second data symbols.

2. The method of optical data transmission according to claim 1, wherein said first data symbols represent respective sets of N data bits, wherein N is an even number, and wherein said second data symbols represent respective sets of N+1 data bits.

3. The method of optical data transmission according to claim 1, wherein said power ratio of said first and said second power level is chosen, such that said second power level is approximately 4 dB higher than said first power level.

4. The method of optical data transmission according to claim 1, wherein said optical signal is a first optical signal lying in a first polarization plane, further comprising the steps of:

transmitting said data bits in the form of data symbols, by modulating a second optical signal in dependence on said data bits and in accordance with said two or more constellation schemes, wherein said second optical signal is an optical signal lying in a second polarization plane orthogonal to said first polarization plane, said transmitting step further comprising the steps of:

generating third data symbols representing respective sets of data bits containing said odd number of data bits, by modulating said second optical signal in accordance with said second constellation scheme, generating fourth data symbols representing respective sets of data bits containing said even number of data bit, by modulating said optical signal in accordance with said first constellation scheme, generating said third and said fourth data symbols at said predefined symbol rate, such that said third and said fourth data symbols are interleaved in time, wherein said data symbols are transmitted, such that said first data symbols and said third data symbols are transmitted at respective same time instances, and such that said second data symbols and said fourth data symbols are transmitted at further respective same time instances.

5. The method of optical data transmission according to claim 4, comprising furthermore transmitting said third data symbols at said second power level, transmitting said fourth data symbols at said first power level, wherein a power ratio of said first and said second power level is chosen to a predefined value.

6. The method of optical data transmission according to claim 4, wherein said third data symbols represent respective sets of N+1 data bits, and wherein said fourth data symbols represent respective sets of N data bits.

7. The method of optical data transmission according to claim 5, wherein said power ratio of said first and said second power level is chosen, such that said second power level is approximately 4 dB higher than said first power level.

8. An optical data transmission device, said device is operable to transmit data bits in the form of data symbols, by modulating an optical signal in dependence on said data bits and in accordance with two or more constellation schemes said device configured to:

generate first data symbols representing respective sets of data bits containing an even number of data bits, by modulating said optical signal in accordance with a first constellation scheme and transmitting said first data symbols at a first power level, generate second data symbols representing respective sets of data bits containing an odd number of data bits, by modulating said optical signal in accordance with a second constellation scheme and transmitting said second data symbols at a second power level, generate said first and said second data symbols at a predefined symbol rate, such that said first and said second data symbols are interleaved in time, wherein a power ratio of said first and said second power level is chosen to a predefined value such that a portion of the first constellation scheme coincides with a portion of the second constellation scheme, and the predefined value is chosen such that a sequence of first data symbols experiences a same bit error ratio as a sequence of second data symbols.

9. The optical data transmission device according to claim 8, wherein said optical signal is a first optical signal lying in a first polarization plane, and wherein said device is further configured to:

transmit said data bits in the form of data symbols, by modulating a second optical signal in dependence on said data bits and in accordance with said two or more constellation schemes, wherein said second optical signal is an optical signal lying in a second polarization plane orthogonal to said first polarization plane, by generate third data symbols representing respective sets of data bits containing said odd number of data bits, by modulating said second optical signal in accordance with said second constellation scheme, generate fourth data symbols representing respective sets of data bits containing said even number of data bit, by modulating said optical signal in accordance with said first constellation scheme, generate said third and said fourth data symbols at said predefined symbol rate, such that said third and said fourth data symbols are interleaved in time, wherein said device transmits said data symbols, such that said first data symbols and said third data symbols are transmitted at respective same time instances, and such that said second data symbols and said fourth data symbols are transmitted at further respective same time instances.

10. A method of optical data transmission, comprising the steps of:

transmitting data bits in the form of data symbols, by modulating an optical signal in dependence on said data bits and in accordance with two or more constellation schemes, said transmitting step further comprising the steps of:

generating first data symbols represented by respective sets of two data bits by modulating said optical signal in accordance with a four quadrature amplitude modulation (4QAM) modulation format and transmitting said first data symbols at a first power level with a first constellation scheme;

generating second data symbols represented by respective sets of three data bits by modulating said optical signal in accordance with an eight quadrature amplitude modulation (8QAM) modulation format and transmitting said second data symbols at a second power level with a second constellation scheme; and generating said first and said second data symbols at a predefined symbol rate, such that said first and said second data symbols are alternated;

wherein the second power level is approximately 4 dB higher than the first power level such that a portion of the first constellation scheme coincides with a portion of the second constellation scheme, and wherein a power ratio of said first and said second power level is chosen to a predefined value such that a sequence of first data symbols experiences a same bit error ratio as a sequence of second data symbols.

11. The method of optical data transmission according to claim 1, wherein said sequence of first data symbols and said sequence of second data symbols are transmitted over a same optical transmission channel or optical transmission link of a pre-defined length.

* * * * *